United States Patent [19]

Hatanaka

[11] Patent Number: 4,689,666
[45] Date of Patent: Aug. 25, 1987

[54] METHOD FOR ELIMINATING NOISE IN REGIONS OF A COLOR IMAGE EXHIBITING A SPECIFIC COLOR

[75] Inventor: Isamu Hatanaka, Tokyo, Japan

[73] Assignee: Fuji Photo Film Co., Ltd., Kanagawa, Japan

[21] Appl. No.: 816,776

[22] Filed: Jan. 7, 1986

[30] Foreign Application Priority Data

Jan. 8, 1985 [JP] Japan .................... 60-1343

[51] Int. Cl.$^4$ ............ H04N 9/64; H04N 1/46; H04N 9/75
[52] U.S. Cl. .......................... 358/36; 358/22; 358/75
[58] Field of Search ............ 358/22, 36, 75, 75 IJ, 358/78, 80

[56] References Cited

U.S. PATENT DOCUMENTS

| | | | |
|---|---|---|---|
| 3,715,477 | 2/1973 | Olson et al. | 358/36 |
| 3,982,273 | 9/1976 | Cochran | 358/36 |
| 4,009,334 | 2/1977 | Sypula | 358/36 |
| 4,496,968 | 1/1985 | Pugsley | 358/75 |
| 4,516,155 | 5/1985 | Hennig et al. | 358/80 |

FOREIGN PATENT DOCUMENTS

| | | | |
|---|---|---|---|
| 68784 | 5/1980 | Japan | 358/22 |
| 163962 | 9/1984 | Japan | 358/75 |

Primary Examiner—James J. Groody
Assistant Examiner—Randall S. Svihla
Attorney, Agent, or Firm—Sughrue, Mion, Zinn, Macpeak, and Seas

[57] ABSTRACT

A spatial image processing method for noise elimination, including the steps of subjecting an image signal representing a color image and including a density data signal component and a color data signal component to processing for extracting color data for each picture element of the image, discriminating regions of the color image exhibiting a specific color on the basis of the extracted color data, and subjecting the image signal to spatial image processing for elimination of noise under different processing conditions for regions of the image exhibiting the specific color and the remaining regions of the image not exhibiting the specific color.

8 Claims, 3 Drawing Figures

METHOD FOR ELIMINATING NOISE IN REGIONS OF A COLOR IMAGE EXHIBITING A SPECIFIC COLOR

BACKGROUND OF THE INVENTION

1. Field of the Invention

The present invention relates to an image processing method for eliminating noise components from a color image signal, and more particularly to an image processing method for producing a color image wherein image portions exhibiting a specific color, e.g. the color of human skin or the color of the sky, are not degraded by noise components and the color quality of other objects within the image regions exhibiting the specific color is not lost.

2. Description of the Prior Art

There are known various methods of spatial image processing for eliminating random noise components from an original image signal. For example, in one such method the original image signal containing noise components is processed so as to uniformly suppress its high frequency components. Although this method effectively eliminates the noise components, the resulting image lacks sharpness and gives a fuzzy impression. For overcoming this disadvantage there is also known a processing method wherein a low-frequency component and a high-frequency component are separated from the original, a low-level signal including noise components is eliminated from the separated high-frequency component, and the low- and high-frequency components are then recombined. Although the image produced using the image signal processed by this method is free of noise and exhibits good sharpness, it tends to lack subtlety and gives the impression of a watercolor painting.

For eliminating this problem there have been suggested methods such as that disclosed in Japanese Unexamined Patent Publication No. 58(1983)-14270, which relates to a method of image processing by using one set of processing conditions for specific regions within the image and a different set of processing conditions for the other regions. As this method makes it possible to effectively retain edge portions of images, it is capable of preventing the aforesaid problem. On the other hand, however, when it is applied for the production of color images including regions representing the human skin, a type of color image that frequently has to be handled in the making of photographic prints and in color printing, there arises a new problem.

More specifically, in a color image including regions representing the human skin, it is these flesh colored portions that are affected most strongly by noise-induced degradation. Thus when the aforesaid method is applied, the flesh colored regions are designated as the specific regions with respect to which the processing for noise elimination is carried out. However, within these flesh colored regions there often exist numerous non-flesh colored objects. For example, in the case of the human face, there will be such non-flesh colored portions as those corresponding to the hair, the eyebrows, the eyes, dimples, wrinkles and possibly even minute objects in the foreground. When the aforesaid image processing is carried out, such objects within the specific regions become smudged and lose their texture.

SUMMARY OF THE INVENTION

In view of the aforesaid drawbacks of the conventional image processing methods, it is an object of the present invention to provide an image processing method capable of giving a beautiful finish to regions of a specific color in a color image. It is another object of the invention to provide an image processing method capable of giving a beautiful finish to regions of a specific color in a color image without degrading the texture of portions within the specific color regions exhibiting colors other than the specific color.

According to the present invention there is provided an image processing method comprising the steps of subjecting an image signal carrying a color image and including density data and color data to processing for extracting color data for each picture element of the image, discriminating regions of the color image exhibiting a specific color on the basis of the extracted color data, nad subjecting the image signal to spatial image processing for elimination of noise under different processing conditions for regions exhibiting the specific color and the remaining regions not exhibiting the specific color.

This image processing method enables elimination of random noise from regions of a color image exhibiting a specific color. Thus when it is applied to eliminate such noise from regions exhibiting a color which is especially strongly affected by such noise, it is highly effective in giving a beautiful finish to these specific color regions. Moreover, the image processing method according to this invention is able to provide this effect without causing smudging of other color regions within the specific color regions so that the objects that these other colors represent do not lose their intrinsic texture. As a result, even when starting from a relatively low quality instant photograph or a poorly finished color print, color film or printed image, by the use of the method of this invention is possible to reproduce color images wherein regions representing people, the sky or the like are done to a beautiful finish.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figures 1, 3:
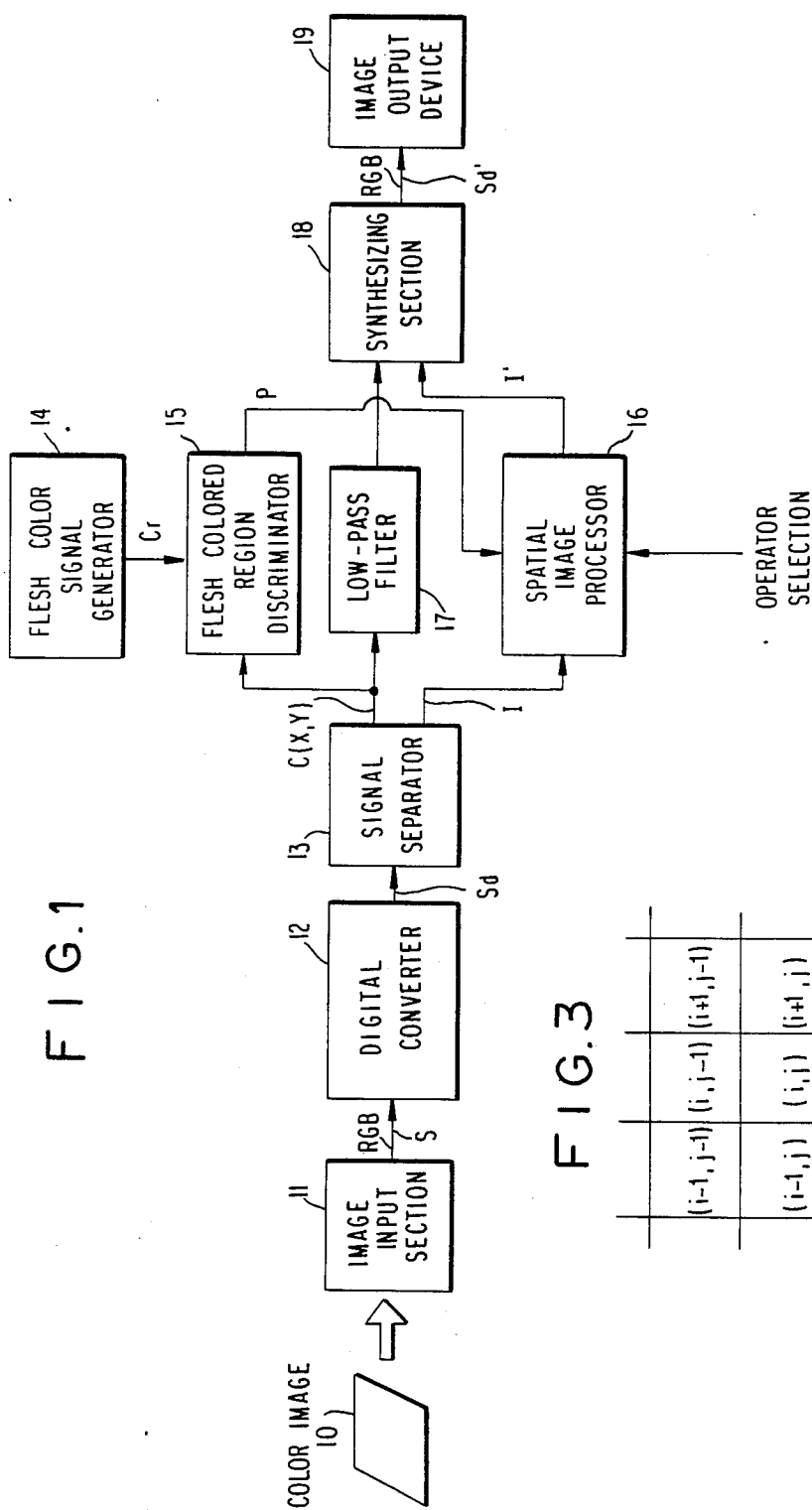
FIG. 1 is a block diagram showing a system for carrying out an embodiment of the image processing method according to the present invention.
FIG. 3 is a view for explaining a spatial filter processing step carried out in the image processing method of the present invention.

FIG. 1 schematically illustrates a system for carrying out image processing in accordance with the method of the present invention. A color image 10 including regions corresponding to the human skin (flesh colored regions), for example an ordinary color print or color film or a printed color image, is read by an image input section 11. The resulting image signal S is forwarded to a digital converter 12 where it is converted into a digital image signal Sd carrying three-color density data for each picture element of the color image 10. As the image reading means of the image input section 11 there can be used an image pickup tube of the type employed in television cameras and the like, a two-dimensional image pickup element consisting of a CCD (charge-coupled device) or the like, a device comprising a three-color reading head consisting of three line sensors each constituted of image pickup elements and combined with a color filter, a microdensitometer for use with color images, or an ordinary color scanner. In the digital converter 12, the digital image signal Sd is produced by dividing the image into 500×500, 512×512 or 1000×1000 picture elements, for example, and for each picture element assigning each of three colors, i.e., red (R), green (G) and blue (B), a gradation signal consisting of, for example, 4 to 8 bits. The digital image signal Sd may, if desired, be temporarily stored in a frame memory.

The digital image signal Sd for the three colors is input to a signal separator 13 which divides it into a density signal I indicating only the image density and a color signal C (X, Y) indicating only the hue. Where the density of each picture element is defined as I=IR+IG+IB (IR, IG and IB being the respective color densities), this color signal C (X, Y) is a function defined for X, Y where X=IG/I and Y=IR/I and represents the hue in terms of these values X and Y. The color signal C (X, Y) is forwarded to a flesh colored region discriminator 15 and the density signal I is forwarded to a spatial image processor 16.

A flesh color signal generator 14 supplies the flesh colored region discriminator 15 with a standard color signal value Cr indicative of flesh color (but covering a prescribed range). The flesh colored region discriminator 15 compares the color signal C (X, Y) for each picture element with this standard color signal Cr and when the color signal C (X, Y) is found to fall within the range of the standard color signal value Cr, it is determined that the picture element concerned is one within a flesh colored region. On the basis of this discrimination, the flesh colored region discriminator 15 supplies the spatial image processor 16 with position data regarding the image elements determined to fall within flesh colored regions, i.e., it supplies the spatial image processor 16 with data P indicating the flesh colored regions in the color image 10.

It should be noted, however, that the aforesaid color signal C (X, Y) is not the only means available for representing the hue of the picture elements of the color image, and there may used instead any of various other known chromatic methods. Nor is the method of the present invention limited to discrimination of the flesh colored regions in the color image 10 by comparing the aforesaid color signal C (X, Y) with the standard color signal value Cr. Instead there may be used any of various known methods such as disclosed, for example, in Japanese Unexamined Patent Publication No. 52(1977)-156624.

Moreover, where the operation involves the production of a printing plate or the like and calls for subjecting the color image 10 to color separation by, for example, a color scanner, it is of course possible to use the process employed by the color scanner for producing a three-color image signal as the means for obtaining the three-color digital image signal Sd. In such case, the digital image signal Sd required for discriminating the flesh colored regions may be obtained by roughly scanning the color image 10. This is advantageous since it reduces the number of picture elements and enables the data processing for discriminating the flesh colored regions to be carried out more rapidly.

The spatial image processor 16 subjects the density signal I input thereto to spatial image processing for eliminating noise therefrom. As shown in the detailed block diagram of the spatial image processor 16 in FIG. 2, the density signal I is first input to a signal separator 20 which, on the basis of the flesh colored region data P supplied thereto from the flesh colored region discriminator 15, separates the density signal I into a flesh colored region density signal In and a non-flesh colored region density signal Im. The flesh colored region density signal In is forwarded to an input switching section 21 which selectively inputs it in accordance with operator selection to a spatial filter processor 22 for noise elimination or a noise elimination circuit 23.

As the spatial filter processor 22 there may be used a known computer system for smoothing filter processing or median filter processing. Although smoothing filter processing and median filter processing are both known types of spatial filter processing for noise elimination, they will be explained briefly here through examples.

FIG. 3 represents nine picture elements, namely a central picture element (i, j) and the eight picture elements immediately surrounding the central picture element (i, j). In the simplest form, smoothing filter processing amounts to finding the simple average of the densities of these nine elements and assigning the average value obtained as the density of the central picture element (i, j). Alternatively, it is possible to obtain a weighted average of the nine densities by, for example, multiplying the density of the central picture element (i, j) by a coefficient such as 3 and multiplying the densities of the surrounding picture elements by a coefficient such as 1 and then assigning the so-obtained weighted average as the density of the central picture element (i, j). The regions used for this filtering operation need not necessarily be 3 by 3 picture elements square, but may be as large as about 10 by 10 picture elements square or may constitute a cross-shaped region or a circular region. The weighting coefficients may also have various other values than those mentioned in the foregoing example.

Referring again to the example shown in FIG. 3, median filter processing would amount to a conversion wherein the central picture element (i, j) is assigned a density value equal to the median value of the densities of the nine picture elements. As in smoothing filter processing, in median filter processing too it is possible to use filter regions of various sizes and configurations.

Upon being input to the noise elimination circuit 23, the flesh colored region density signal In is first separated into a high-frequency component IH and a low-frequency component IL by a signal separation circuit 24. The high-frequency component IH, which includes the random noise component, is forwarded to a high level emphasizer 25 where its high level, i.e., its wanted signal component, is emphasized. It is then passed to a low level cut circuit 26 where its low level component, i.e., the noise component, is removed by a nonlinear circuit element or the like. After being processed in this manner, the high-frequency component IH is recombined with the low-frequency component IL in a signal synthesizer 27.

By providing the spatial image processor 16 with both the spatial filter processor 22 and the noise elimination circuit 23 and making it possible to switch between these two processors by the operation of the input switching section 21, it becomes possible to select whichever of the two modes of noise component elimination is better suited to the particular color image 10 being processed. The provision of dual processing modes is, however, not essential to the invention and it is alternatively possible to provide only the spatial filter processor 22 or only the noise elimination circuit 23 and carry out noise elimination in one fixed manner.

As for the non-flesh colored region density signal Im, this is input directly to a signal synthesizer 28 without being subjected to any processing for the elimination of noise components of the type described in the foregoing. The signal synthesizer 28 also receives the flesh colored region density signal In removed of noise components by the spatial filter processor 22 or the noise elimination circuit 23 and synthesizes the flesh colored region density signal In and the density signal Im. The result of this synthesis is output as a density signal I'.

As shown in FIG. 1, the density signal I' output by the spatial image processor 16 is applied to a signal synthesizing section 18 which synthesizes it with the color signal C (X, Y) to produce a digital image signal Sd' for each of the three colors R, G and B.

The illustrated embodiment is further provided with a low-pass filter 17 through which the color signal C (X, Y) is passed for removal of color unevenness components. Where processing for removal of color unevenness is unnecessary, the low-pass filter 17 may be omitted. On the other hand, if desired, it is possible to include steps for correction of color balance or other types of color tone correction. Moreover, when such color tone correction processing or balance correction is conducted, it can be carried out either in respect of the analog image signal S or in respect of the digital image signal Sd prior to dividing out the color signal C (X, Y) or the digital image signal Sd' output by signal synthesizing section 18. When carried out with respect to one of these digital signals, it can be conducted using a table stored in a ROM (read-only memory).

Also, the synthesis of signals in the signal synthesizing section 18 can be facilitated by temporarily storing the color signal C (X, Y) passed through the low-pass filter 17 and the density signal I' subjected to spatial image processing in the processor 18 in respective frame memories (not shown). It is further possible to constitute the processing sectors from the signal separator 13 to the signal synthesizing section 18 in the aforesaid embodiment by means of a computer system.

The digital image signal Sd' output by the signal synthesizing section 18 is sent to an image output device 19 which, based on an image signal obtained by analog conversion of the image signal Sd', outputs the color image 10 in visible form. As the image output device 19 there may be used any of various devices such as, for example, a color CRT, a light-scanning type recording device which exposes a color photographic film to three different colored laser beams, a device comprising a liquid crystal shutter panel (of array or matrix type) and a three-color filter positioned between a color photographic film and an exposure light source and arranged such that the liquid crystal shutter panel is driven by the image signal so as to expose the color photographic film to imagewise light of three colors.

Since the flesh colored region density signal In was subjected to processing for elimination of noise components as described above, the flesh colored regions in the color image reproduced on the basis of the image signal Sd' are free from random noise. On the other hand, since the non-flesh colored region density signal Im was not subjected to processing for elimination of noise components, the non-flesh colored regions within the flesh colored regions, for example the regions representing hair, eyebrows, eyes, dimples, wrinkles and the like within a region representing a face, are not affected by smudging.

Like regions corresponding to human skin, regions corresponding to the sky are also relatively strongly affected by noise. Therefore, in the case of a color image including both people and scenery, it may be found advantageous to additionally discriminate the regions corresponding to the sky in the same way as that used for discriminating flesh colored regions and to carry out spatial image processing for noise elimination with respect to these regions in addition to that carried out with respect to the flesh colored regions.

Figure 2:
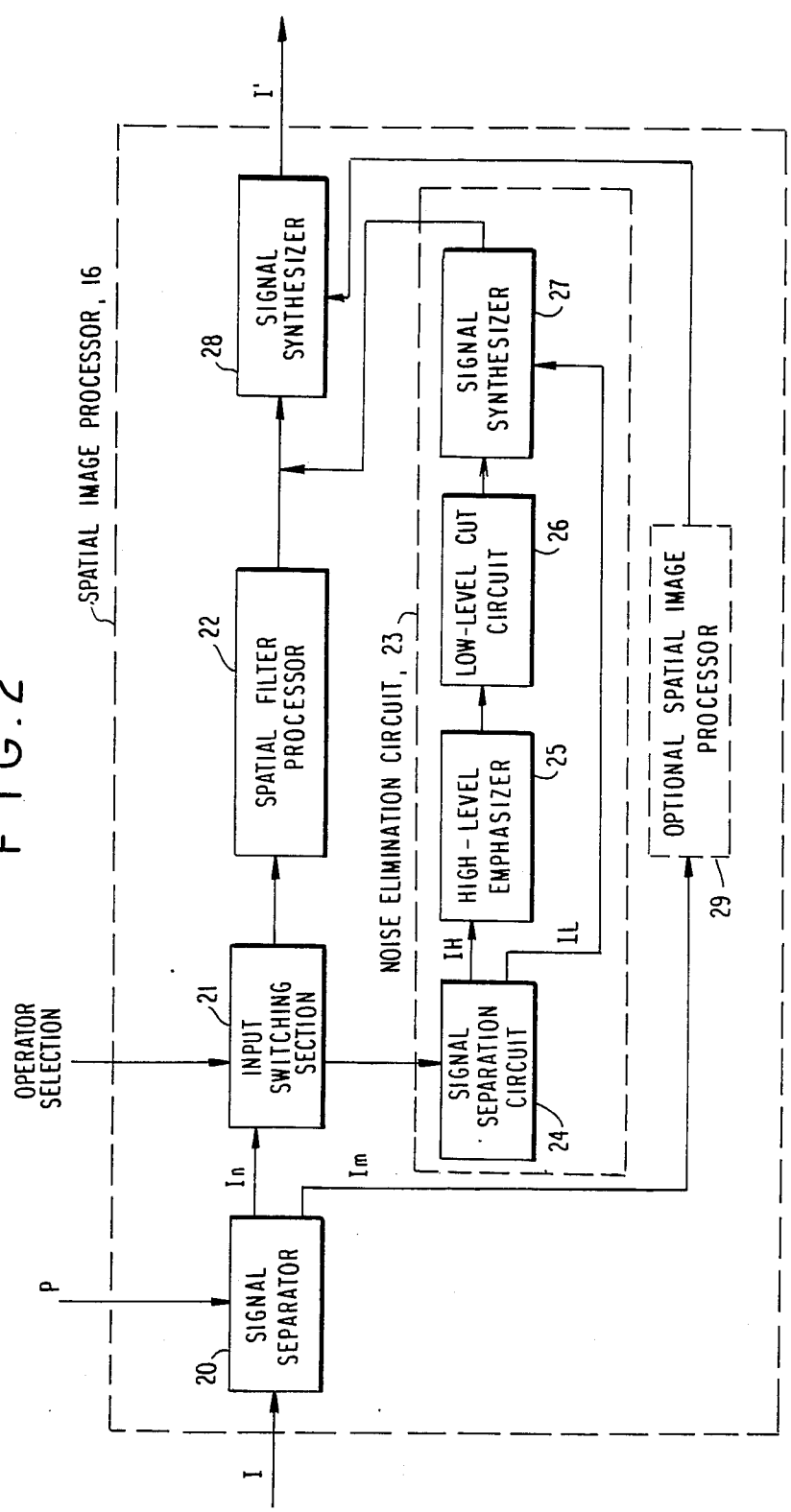
FIG. 2 is a detailed block diagram of one part of the system shown in FIG. 1.

While in the aforesaid embodiment no spatial image processing was carried out with respect to non-flesh colored region density signal Im, the density signal Im may be subjected to a very slight degree of spatial image processing by optional spatial image processor 29 shown in FIG. 2 if it is particularly desired to eliminate as much noise as possible from the background etc. of people in the image.

I claim:

1. An image processing method comprising the steps of:
    subjecting an image signal representing a color image and including a density signal component indicative of density data for each of a plurality of picture elements and a color signal component indicative of color data for each of said plurality of picture elements to processing for extracting said color data for each of said plurality of picture elements;
    discriminating regions of the color image exhibiting a specific color on the basis of the extracted color data;
    subjecting the image signal representing said regions of the color image exhibiting said specific color to a selected one of a noise elimination processing and a first spatial image processing for elimination of noise; and
    optionally subjecting the image signal representing regions of the color image not exhibiting said specific color to a second spatial image processing for elimination of noise.

2. An image processing method as defined in claim 1 in which said density signal component and said color signal component are separated from said image signal, said density signal component is subjected to said selected one of a noise elimination processing and a first spatial image processing, said color signal component has color unevenness components removed therefrom, and the processed density and color signal components are synthesized into a processed image signal.

3. An image processing method as defined in claim 2 in which said first spatial image processing is smoothing filter processing.

4. An image processing method as defined in claim 2 in which said first spatial image processing is median filter processing.

5. An image processing method as defined in claim 1 in which said noise elimination processing consists of separating said density signal component into a high-frequency component and a low-frequency component, eliminating a low-level noise component from said high-frequency component, and thereafter synthesizing said high-frequency component and said low-frequency component into a processed density signal component.

6. An image processing method as defined in any of claims 1 to 5 in which said regions of the color image exhibiting said specific color are regions of the color image exhibiting flesh color.

7. An image processing method as defined in claim 2 in which said noise elimination processing consists of separating said density signal component into a high-frequency component and a low-frequency component, eliminating a low-level noise component from said high-frequency component, and thereafter synthesizing said high-frequency component and said low-frequency component into a processed density signal component.

8. An image processing method as defined in claim 7 in which said regions of the color image exhibiting said specific color are regions of the color image exhibiting flesh color.

* * * * *